United States Patent
Mekky et al.

(10) Patent No.: US 10,038,706 B2
(45) Date of Patent: Jul. 31, 2018

(54) SYSTEMS, DEVICES, AND METHODS FOR SEPARATING MALWARE AND BACKGROUND EVENTS

(71) Applicant: VERISIGN, INC., Reston, VA (US)

(72) Inventors: Hesham Mekky, Falcon Heights, MN (US); Abedelaziz Mohaisen, Williamsville, NY (US)

(73) Assignee: VERISIGN, INC., Reston, VA (US)

( * ) Notice: Subject to any disclaimer, the term of this patent is extended or adjusted under 35 U.S.C. 154(b) by 62 days.

(21) Appl. No.: 14/923,210

(22) Filed: Oct. 26, 2015

(65) Prior Publication Data

US 2016/0127397 A1  May 5, 2016

Related U.S. Application Data

(60) Provisional application No. 62/073,774, filed on Oct. 31, 2014.

(51) Int. Cl.
*H04L 29/06* (2006.01)
*G06F 21/56* (2013.01)

(52) U.S. Cl.
CPC ........ *H04L 63/1416* (2013.01); *G06F 21/566* (2013.01); *H04L 63/145* (2013.01); *H04L 63/1433* (2013.01)

(58) Field of Classification Search
CPC ............. H04L 63/1416; H04L 63/1433; H04L 63/145; G06F 21/566
See application file for complete search history.

(56) References Cited

U.S. PATENT DOCUMENTS

| | | | |
|---|---|---|---|
| 8,161,548 B1 * | 4/2012 | Wan | G06F 21/566 713/188 |
| 2013/0091571 A1 * | 4/2013 | Lu | G06F 21/563 726/23 |
| 2013/0097704 A1 | 4/2013 | Gavrilut et al. | |
| 2013/0104230 A1 * | 4/2013 | Tang | G06F 21/552 726/23 |

(Continued)

OTHER PUBLICATIONS

McCune et al. "Analysis of Ecological Communities", MjM Software Design, 2002, Chapter 6.*

(Continued)

*Primary Examiner* — Robert B Leung
(74) *Attorney, Agent, or Firm* — Artegis Law Group, LLP

(57) ABSTRACT

Embodiments relate to systems, devices, and computing-implemented methods for separating malware and background events to classify malware based on traffic data by receiving the traffic data that includes malware events and background noise, converting the traffic data into a feature vector, performing a signal processing algorithm on the feature vector to separate the malware events from the background noise, where the signal processing algorithm is associated with a malware family, determining a score for the malware events using a malware classification algorithm associated with the malware family, and applying a label associated with the malware family to the traffic data based on the score to classify the traffic data. Additionally, the malware application can be contained, removed, and/or the effects of a malware application can be neutralized based on the classification.

20 Claims, 4 Drawing Sheets

(56) References Cited

U.S. PATENT DOCUMENTS

| | | | | |
|---|---|---|---|---|
| 2014/0090061 | A1* | 3/2014 | Avasarala | G06F 21/56 726/24 |
| 2015/0128263 | A1* | 5/2015 | Raugas | H04L 63/1408 726/23 |
| 2015/0195299 | A1* | 7/2015 | Zoldi | H04L 63/1433 726/25 |

OTHER PUBLICATIONS

Z. Tan et al. "Network Intrusion Detection Based on LDA for Payload Feature Selection," IEEE Globecom 2010 Workshop on Web and Pervasive Security, pp. 1545-1549.*
P. Narang et al. "Feature Selection for Detection of Peer-to-Peer Botnet Traffic," COMPUTE'13, Aug. 22-24, 2013.*
S. Zander et al. "Automated Traffic Classification and Application Identification using Machine Learning," Proceedings of the IEEE Conference on Local Computer Networks 30th Anniversary (LCN'05), 2005.*
J. M. Beaver et al. "A Learning System for Discriminating Variants of Malicious Network Traffic," 8th Annual Cyber Security and Information Intelligence Research Workshop, 2012.*
J. A. Saez et al. "Tackling the problem of classification with noisy data using Multiple Classifier Systems: Analysis of the performance and robustness," Information Sciences 247 (2013), available Jun. 13, 2013.*
Yang, Dayu & Qi, Hairong. (2009). A Network Intrusion Detection Method using Independent Component Analysis. 1-4. 10.1109/ICPR.2008.4761087. (Year: 2009).*
Shih, Hong-Chi et al. (2008). Detection of Network Attack and Intrusion Using PCA-ICA. 10.1109/ICICIC.2008.225. (Year: 2008).*
Extended European Search Report dated Mar. 22, 2016, European Application No. 15192056.8, pp. 1-9.
Aziz Mohaisen et al., "Chatter: Classifying Malware Families Using System Event Ordering", 2014 IEEE Conference on Communications and Network Security, pp. 283-291.
Florin Vancea et al., "NEAR—Network Extractor of Anomaly Records or Traffic Split-Counting for Anomaly Detection", 2013 IEEE EuroCon, pp. 60-64.
Anthony J. Bell et al., "An information-maximization approach to blind separation and blind deconvolution", Neural computation, vol. 7, No. 6, 1995, pp. 1-38.
Leo Breiman et al., "Random Forests", Machine Learning, vol. 45, No. 1, 2001, pp. 1-34.
Isabelle Guyon et al., "Gene Selection for Cancer Classification using Support Vector Machines", Machine Learning, vol. 46, 2002, pp. 389-422.
Aapo Hyvarinen, "Fast and Robust Fixed-Point Algorithms for Independent Component Analysis", IEEE Transactions on Neural Networks, vol. 10, No. 3, 1999, pp. 626-634.
Deguang Kong et al., "Discriminant Malware Distance Learning on Structural Information for Automated Malware Classification", Proceedings of the 19th ACM SIGKDD International Conference on Knowledge Discovery and Data Mining. ACM, 2013, pp. 1357-1365.
Aziz Mohaisen et al., "AV-Meter: An Evaluation of Antivirus Scans and Labels", Detection of Intrusions and Malware, and Vulnerability Assessment, 2014, pp. 112-131.
Aziz Mohaisen et al., "Chatter: Exploring Classification of Malware based on the Order of Events", IEEE CNS, 2014, pp. 1-10.
Konrad Rieck et al., "Learning and Classification of Malware Behavior", Detection of Intrusions and Malware, and Vulnerability Assessment, Springer Berlin Heidelberg, 2008, pp. 108-125.

* cited by examiner

SYSTEMS, DEVICES, AND METHODS FOR SEPARATING MALWARE AND BACKGROUND EVENTS

CROSS-REFERENCE TO RELATED APPLICATIONS

This application claims priority to U.S. Provisional Patent Application having Ser. No. 62/073,774, which was filed on Oct. 31, 2014, and is incorporated herein by reference in its entirety.

BACKGROUND

Malicious software, also referred to as "malware," is any software used to, for example, disrupt computer operations, gather sensitive information, or gain access to private computer systems. Malware can appear as executable code, scripts, active content, etc.

Malware can be detected and classified using techniques that compare malware events (e.g. network traffic or other events caused by malware) with classification models. Classifying malware facilitates in identifying an appropriate process for containing, removing, or otherwise neutralizing the effects of the malware.

However, often malware events are mixed with background events. Background events can include traffic or other events from other processes (both malware and legitimate), as well as intentional noise produced by the malware to disguise its own events Therefore, there is a need for systems and methods for separating malware and background events to facilitate malware classification.

SUMMARY

The present disclosure relates to systems, devices, and methods for separating malware and background events in traffic data to classify malware based on the traffic data.

In at least one embodiment, a computing device can receive the traffic data that includes malware events and background noise and convert the traffic data into a feature vector. The computing device can perform a signal processing algorithm on the feature vector to separate the malware events from the background noise, where the signal processing algorithm is associated with a malware family. Additionally, the computing device can determine a score for the malware events using a malware classification algorithm associated with the malware family, and apply a label associated with the malware family to the traffic data based on the score to classify the traffic data. Further, the malware application can be contained, removed, and/or the effects of a malware application can be neutralized based on the classification.

In at least one embodiment, the computing device can convert the traffic data into the feature vector by converting events in the traffic data into words and performing an n-gram analysis on the words.

In at least one embodiment, the signal processing algorithm can be an independent component analysis signal processing algorithm.

In at least one embodiment, the signal processing algorithm can be associated with the malware family by inputting a model for the malware family into the signal processing algorithm.

In at least one embodiment, the classification algorithm can be associated with the malware family by inputting sample feature vectors of the malware family into the classification algorithm.

In at least one embodiment, the computing device can additionally perform a second signal processing algorithm on the feature vector to separate the malware events from the background noise, where the second signal processing algorithm is associated with a second malware family, and determine a second score for the malware events using a second malware classification algorithm associated with the second malware family, where applying the label associated with the malware family to the traffic data is further based on comparing the score to the second score.

In at least one embodiment, comparing the score to the second score can include performing a distance function on the score and the second score and applying the label associated with the malware family to the traffic data can be further based on a distance determined by the distance function.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
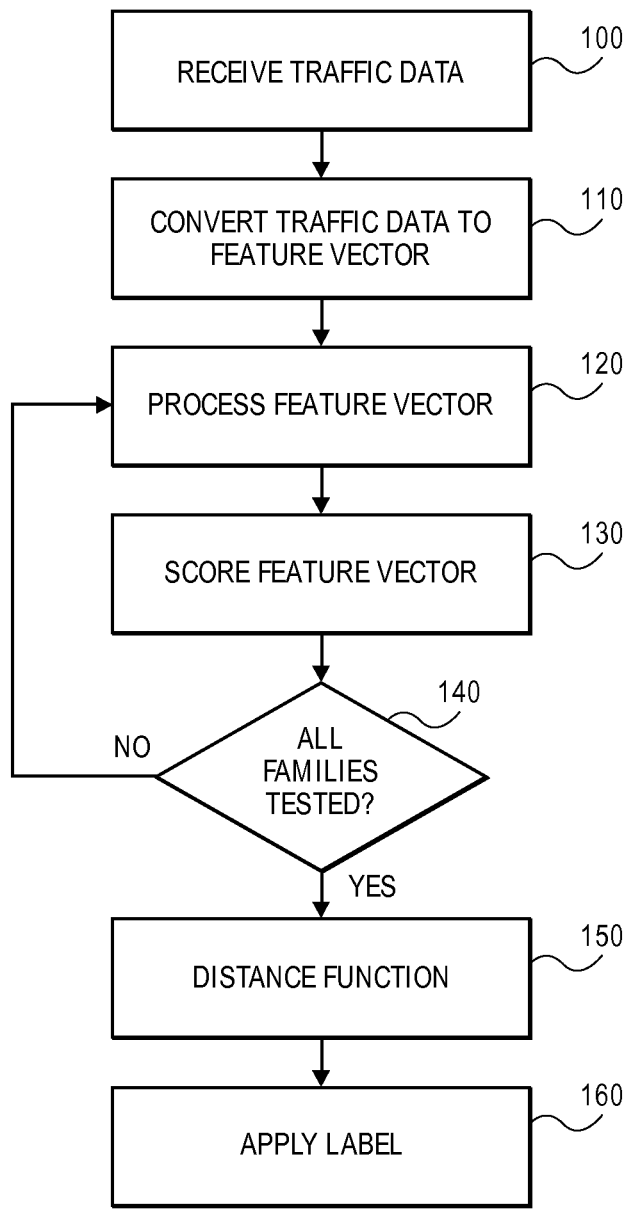
FIG. 1 is a flow diagram illustrating an example malware classification method, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a flow diagram illustrating an example malware classification method, consistent with certain disclosed embodiments. In some embodiments, the method described in FIG. 1 can be performed using an end user computing device such as, for example, a desktop computer, a laptop, a tablet device, a mobile device (e.g., a smartphone), etc. In other embodiments, the method described in FIG. 1 can be performed using a computing device such as, for example, a data base server (e.g., a domain name registry), a web server, a mainframe computer, etc.

The process can begin in 100, when the computing device receives traffic data. In some implementations, the traffic data can be from one or more devices that are known or suspected to have executed an unidentified malware application. Accordingly, the traffic data can include events corresponding to the unidentified malware application and events corresponding to background noise (e.g., intentional noise created by the malware, events from other applications, etc.). In some embodiments, the traffic data can be from the computing device performing the method of FIG. 1. In other embodiments, the traffic data can be received from a remote device.

In some embodiments, the traffic data can include memory usage, network usage, file system usage, registry usage, etc. of the one or more devices that are known or suspected to be executing the unidentified malware application. The memory usage data can include, for example, memory locations accessed, changes made to memory, amount of memory used, attempts to access illegal or protected memory, etc. The network usage data can include, for example, network traces and/or packages captured using a packet capture program. The network packages can be processed to determine information such as, for example, destination Internet protocol (IP) addresses, Uniform Resource Locator (URL) addresses or domain names of outgoing messages, source IP addresses of incoming messages, file names of files transferred to or from the devices, communication protocols used, ports used, etc. The file system usage data can include, for example, names of files that are added, names of files that are deleted, names of files that are altered, changes in file system structure, etc. The registry data can include, for example, changes to system hardware settings, names of programs installed, names of programs uninstalled, changes to user accounts, etc.

In 110, the traffic data can be converted to a feature vector. In some embodiments, elements of the traffic data can be converted into a sequence of words, where each word indicates the occurrence of a particular event. For example, the words associated with network usage data can correspond to two-way communications between malware and a remote command and control (C&C) server, where each communication is converted to a word based on the communication protocol used, the port used, the type of the communication, the source IP address, the destination IP address, the file size of the communication, etc. The sequence of words can be processed using an n-gram analysis, where the words can be decomposed into n-grams of, for example, one to five letters (i.e., 1-gram to 5-grams), and a feature vector is constructed based on the n-gram analysis.

In 120, the feature vector can be input into a signal processing algorithm. In some embodiments, the feature vector can be input into an independent component analysis (ICA) signal processing algorithm to separate the multivariate feature vector (i.e., the feature vector containing both the malware events and the background events) into subcomponents. For example, assuming m independent feature vectors $S=[S_1, \ldots, S_m]^T$ and mixed feature vectors $X=[X_1, \ldots, X_m]^T$, where $X=A \cdot S$ and A is a mixing matrix, an ICA signal processing algorithm can determine an unmixing matrix $W(\approx)A^{-1}$ such that $Y=W \cdot X \approx S$ will be the best approximation for S.

ICA signal processing algorithms rely on independence to recover the original signals (e.g., feature vectors) from a mixture. For instance, given two signals X and Y, the entropy H(X) is a measure of uncertainty in X (i.e., the lower the value the more information there is about X), conditional entropy H(X|Y) is the amount of uncertainty in X after the observation of Y, and mutual information $I(X; Y)=H(X)-H(X|Y)$ is the reduction of uncertainty in X after the observation of Y.

Therefore, by having ICA signal processing algorithms that minimizes the mutual information between estimated components, latent variables that are maximally independent (i.e., hidden distributions for components that are independent) can be located.

In some embodiments, a signal processing algorithm (e.g., an ICA signal processing algorithm) that is associated with a specific malware family can be used. In such embodiments, the signal processing algorithm can be developed by training the algorithm. For example, known malware applications in a malware family can be executed in a controlled environment for a predefined amount of time to collect sample traffic data generated by the malware applications. Additionally, sample background noise data can be generated by monitoring, for example, web browsing of regular (non-malware infected) devices. A feature vector for each malware sample can be created based on the ordering of events in the sample traffic data generated by the malware applications. The sample traffic data and the sample background noise can be converted into words and an n-gram analysis can be performed on the words to construct the sample feature vectors, as described above. Then, the top discriminating features (i.e., n-gram features) between the malware family and the background traffic can be selected using recursive feature elimination.

The signal processing algorithm for the specific malware family can be generated by mixing the top discriminating features linearly. The resulting mix is input into the signal processing algorithm to build a model for the specific malware family. The model can then be used as part of the signal processing algorithm to decompose the feature vector received in 120 into two subcomponents, a malware feature vector and background noise.

In some embodiments, some n-grams in traffic data may be missing in the malware sample or background noise sample data. Accordingly, in some implementations, a skipping factor $\lambda$ can be used to skip over words in the profiles. For example, a sequence of words "w1 w2 w3 w4" with $\lambda=1$ can be used to generate the bi-grams {(w1 w2), (w1 w3), (w2 w3), (w2w4), (w3 w4)}.

In 130, a classification algorithm can be performed on the decomposed malware feature vector to determine a classification score for the specific malware family. In some embodiments, a machine learning classification algorithm can be used. For example, an ensemble machine learning method (e.g., Random Forests) can be used by inputting sample feature vectors for a malware family and the decomposed malware feature vector into the classification algorithm. The classification algorithm can then output a score based on the similarity between the decomposed malware feature vector and the malware samples. The output score can represent the classification score for the traffic data for the specific malware family.

In some embodiments, the computing device can perform 120-140 for each malware family available. Accordingly, in 140, the computing device can determine whether each malware family has been tested (i.e., whether a score has been obtained for each malware family). If, in 140, there are additional malware families to test, the computing device can return to 120 to process the undecomposed feature vector for the traffic date using the signal processing algorithm and classification algorithm for the next malware family. If, in 140, there are no additional malware families to test, the computing device can proceed to 150.

In other embodiments, the computing device can determine whether the output score meets or exceeds a threshold score. If the score meets or exceeds the threshold score, the computing device can proceed directly to 160 where a label is applied. If the score does not meet or exceed the threshold score, the computing device can return to 120 and perform 120-140 for subsequent malware families until a score that meets or exceeds the threshold score is obtained or until all classifications have been tested.

In 150, the classification scores can be input into a distance function to determine, for example, a distance metric between each pair of scores.

In 160, the computing device can associate the traffic data with a classification label. The classification label can represent that the traffic data includes traffic associated with a specific malware family.

In some embodiments, the computing device can associate the traffic data with a classification label based on the distances between each pair of scores. For example, if a score for a specific malware family has a large distance from every other score, then the classification label associated with the malware family can be applied to the traffic data.

In other embodiments, the computing device can associated the traffic data with a classification label for the malware family associated with the classification score that met or exceeded the threshold. For example, if the classification score is associated with the Operation Shady RAT cyber-attacks and the classification score exceeds the threshold, the traffic data can be associated with the label SRAT.

In further embodiments, the computing device can associated the traffic data with a classification label for the malware family associated with the highest classification score determined. For example, if a classification score is associated with the Darkness (Optima) Distributed Denial of Service (DDoS) bot and the classification score was the highest classification score, the traffic data can be associated with the label DARKNESS.

In other implementations, the computing device can determine to not label the traffic data based on, for example, no classification score meeting or exceeding the threshold and/or the distances between each pair of scores being low. Accordingly, for example, the traffic data may not contain malware traffic and/or may include traffic from a new family of malware that is not associated with any malware families that are tested.

In various embodiments, the malware classification label can be used to apply the appropriate processes to contain, remove, or otherwise neutralize the effects of the malware identified in the traffic data. For example, the computing device can quarantine a data file known to be corrupted by a particular malware family based on the malware classification label and/or can send instructions to the source of the traffic data to quarantine the data file. As an additional example, the computing device can delete one or more files known to be associated with a particular malware family based on file names, locations, and/or traffic events created by the one or more files and/or can send instructions to the source of the traffic data to delete the one or more files.

While the steps depicted in FIG. 1 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 2:
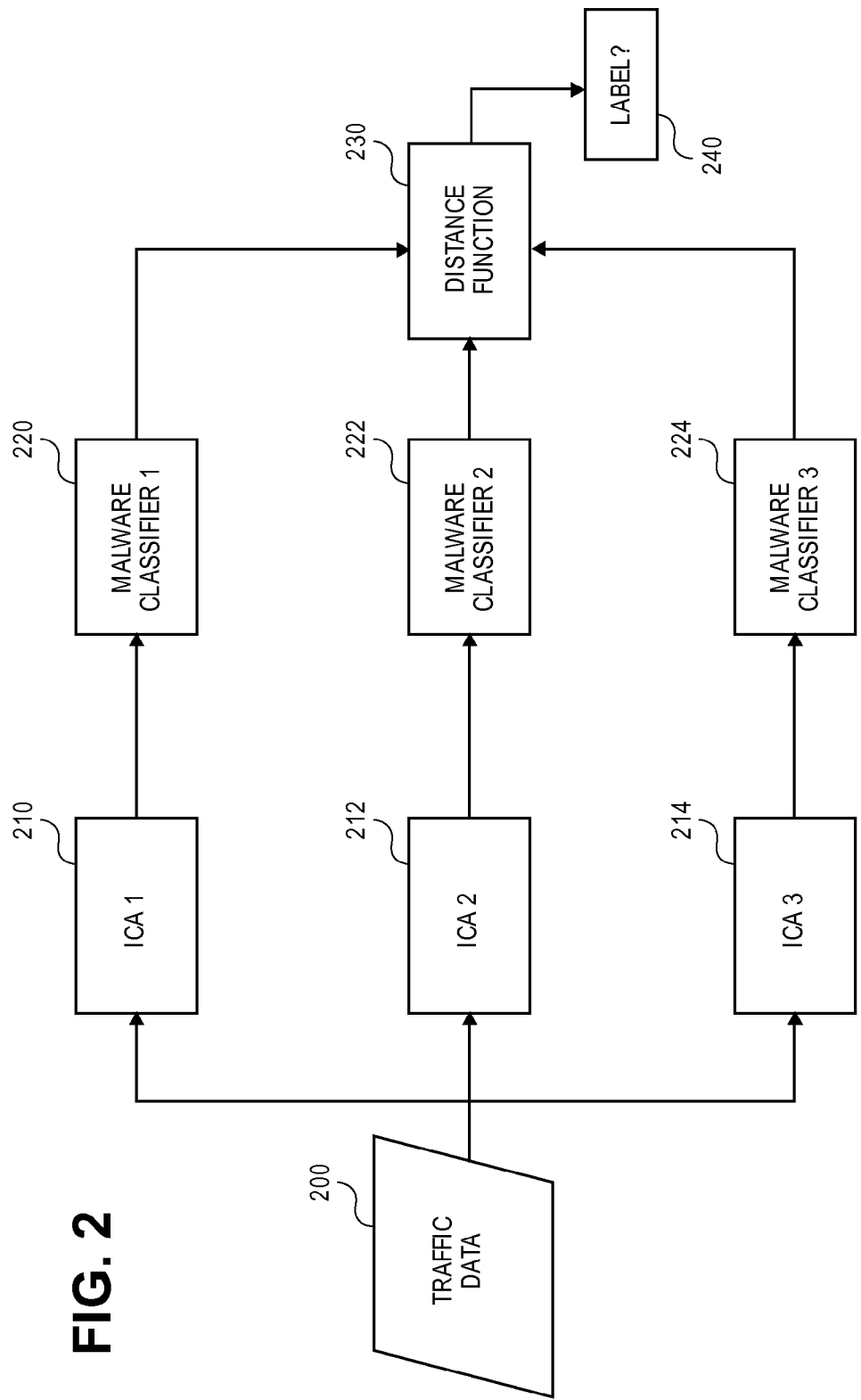
FIG. 2 is a flow diagram illustrating an example malware classification process, consistent with certain disclosed embodiments.

FIG. 2 is a flow diagram illustrating an example malware classification process, consistent with certain disclosed embodiments. In some embodiments, the method described in FIG. 2 can be performed using an end user computing device such as, for example, a desktop computer, a laptop, a tablet device, a mobile device (e.g., a smartphone), etc. In other embodiments, the method described in FIG. 2 can be performed using a computing device such as, for example, a data base server (e.g., a domain name registry), a web server, a mainframe computer, etc.

The process can begin in 200, when the computing device receives traffic data. In some implementations, the traffic data can be from one or more devices that are known or suspected to have executed an unidentified malware application. Accordingly, the traffic data can include events corresponding to the unidentified malware application and events corresponding to background noise (e.g., intentional noise created by the malware, events from other applications, etc.). In some embodiments, the traffic data can be from the computing device performing the method of FIG. 2. In other embodiments, the traffic data can be received from a remote device.

In some embodiments, the traffic data can include memory usage, network usage, file system usage, registry usage, etc. of the one or more devices that are known or suspected to be executing the unidentified malware application. The traffic data can be converted to a feature vector, as described above.

The feature vector can be sent as input into multiple signal processing algorithms. For example, as shown in FIG. 2, the feature vector can be sent as input into three ICA signal processing algorithms 210, 212, and 214. Each ICA signal processing algorithm can be associated with a specific malware family (e.g., SRAT, Darkness, etc.). In some embodiments, each ICA signal processing algorithm is developed by training the algorithm using sample feature vectors, as described above.

In some embodiments, the result of each of ICA signal processing algorithms 210, 212, and 214 is a malware feature vector and background noise. The malware feature vector from each algorithm can be sent as input into a corresponding malware classification algorithm that assigns a score to the malware feature vector that indicates the likelihood that the unidentified malware application is in the associated malware family. For example, each of ICA signal processing algorithms 210, 212, and 214 can send the malware feature vector output to the corresponding malware classification algorithm, i.e., malware classification algorithms 220, 222, and 224. In some embodiments, each malware classification algorithm uses sample malware feature vectors for the specific malware family to score the malware feature vector being tested.

In some embodiments, each ICA signal processing algorithm and its corresponding classification algorithm can represent a sequence of processes or computational threads that are performed in a specific order. Accordingly, each ICA signal processing algorithm and classification algorithm pair can be independent of each other. Therefore, in some embodiments, the ICA signal processing algorithm and classification algorithm pairs can be performed in any order and/or can be performed in parallel (e.g., using multiple devices, multiple processors, parallel processors, etc.).

Each classification algorithm can output the score and the output score can be sent to a distance function algorithm (e.g., distance function 230). The distance function algorithm can, for example, determine a distance metric between each pair of scores.

The distance metric for each pair of scores can then be sent to classification labeling algorithm 240. In some embodiments, the malware signal can be assigned a classification label (e.g., SRAT, Darkness, etc.) based on the distances between each pair of scores. For example, if a score from one malware family has a large distance from every other score, then the classification label associated with the malware family can be applied to the traffic data, indicating that the traffic data likely includes traffic from a malware application in the malware family.

In some implementations, the computing device can determine to not label traffic data based on, for example, each distance between each pair of scores being low. Accordingly, for example, the traffic data may not contain malware traffic and/or may include traffic from a new family of malware that is not associated with any malware families that are tested.

In various embodiments, the malware classification label can be used to apply the appropriate processes to contain, remove, or otherwise neutralize the effects of the malware.

While the steps depicted in FIG. 2 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
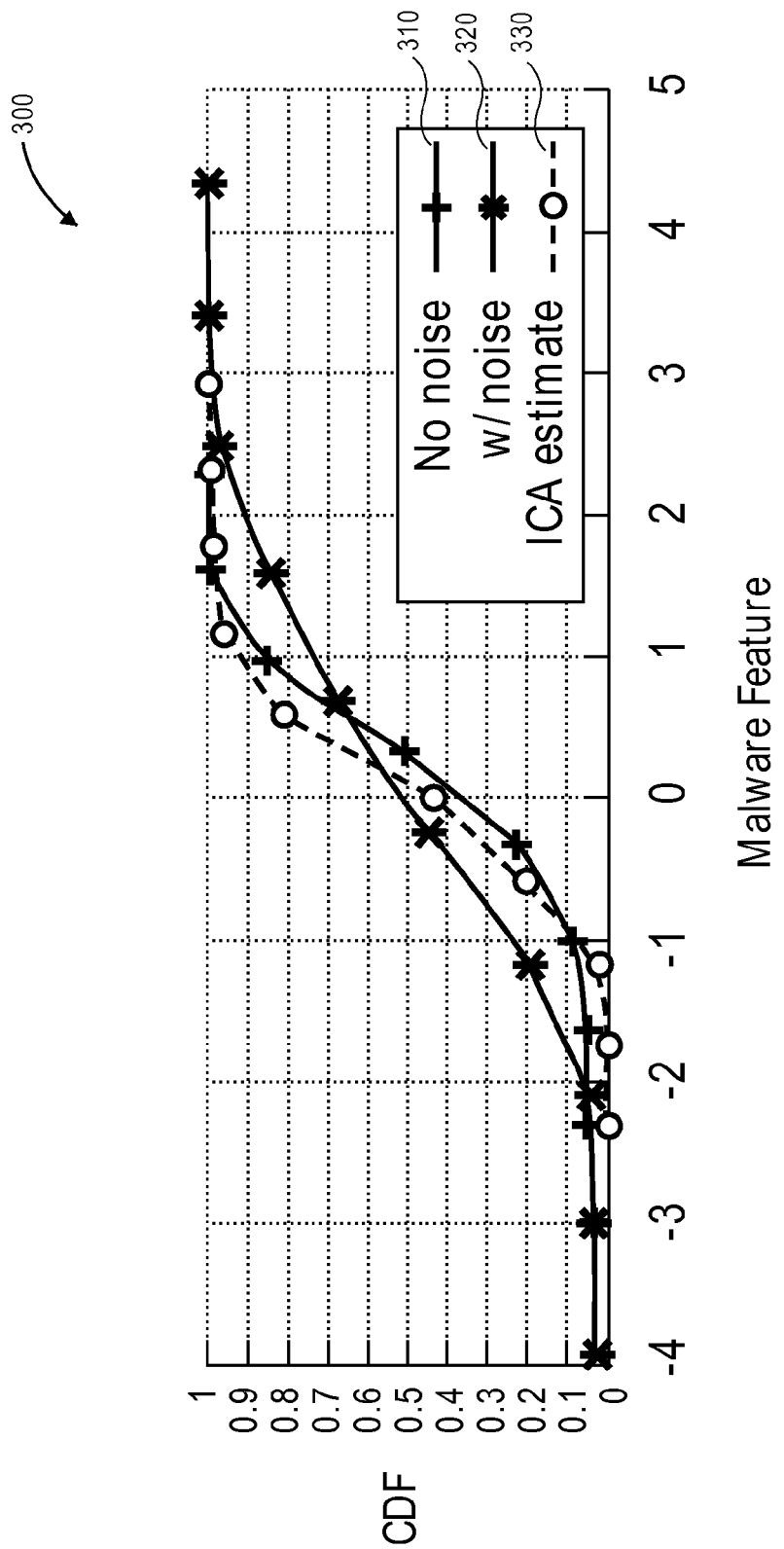
FIG. 3 is an example graph demonstrating results of using an signal processing algorithm on mixed traffic data, consistent with certain disclosed embodiments.

FIG. 3 is an example graph demonstrating results of using an ICA signal processing algorithm on mixed traffic data. Graph 300 can be cumulative density function (CDF) graph that includes feature vector 310 that represents a sample of data corresponding to a malware family, where the sample does not include background noise data. For example, feature vector 310 can be created by executing a malware application in the malware family in a controlled environment for a predefined amount of time, recording events, converting the events to words, and performing an n-gram analysis on the words to generate feature vector 310.

Graph 300 can also include feature vector 320 that represents mixed traffic data that includes events from malware in the malware family and background noise. For example, feature vector 320 can be created by converting the events in received traffic data to words and performing an n-gram analysis on the words to generate feature vector 320.

Graph 300 can also include a feature vector 330 that represents data output from an ICA signal processing algorithm where feature vectors 310 and 320, and, in some embodiments, other sample feature vectors, are input into the ICA signal processing algorithm and the ICA signal processing algorithm separates malware event data from background noise to create feature vector 330.

As shown in FIG. 3, feature vectors 310 and 330 are similar, and, thus, a malware classifier for this malware family would output a high similarity score if feature vector 330 was input into the classifier. According, the ICA signal processing algorithm output provides a good approximation for the original malware features.

Further, feature vector 320 has noticeable differences from lines 310 and 330, thus demonstrating that a malware classifier would output a lower similarity score for the mixed data, compared to the data from the ICA signal processing algorithm. Accordingly, using the ICA signal processing algorithm, trained for the malware family, enables removing background events from mixed traffic.

The graph depicted in FIG. 3 is presented merely for the sake of illustrating the effects of performing an ICA signal processing algorithm, and is not intended to be limiting.

Figure 4:
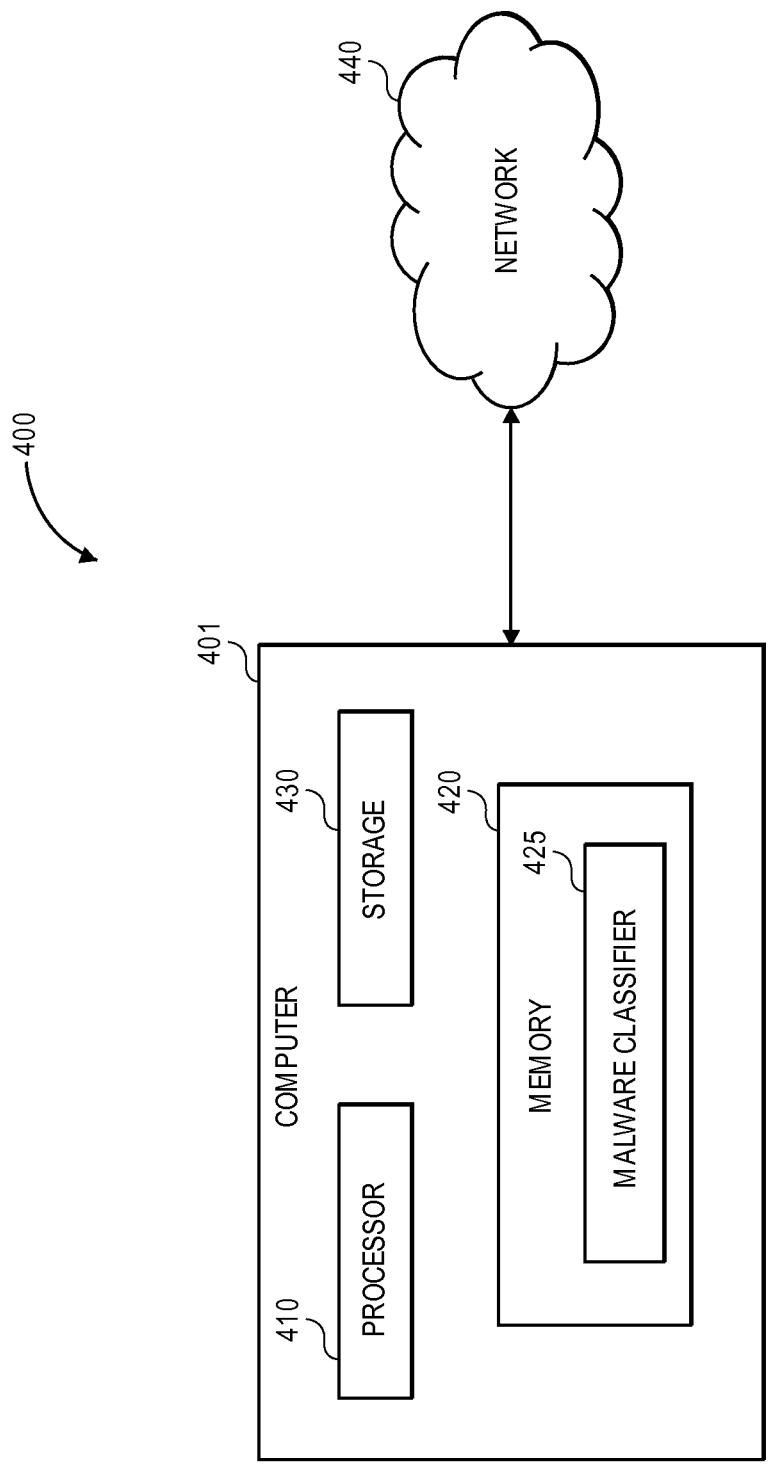
FIG. 4 is a diagram illustrating an example of a hardware system for classifying malware, consistent with certain disclosed embodiments.

FIG. 4 is a diagram illustrating an example of a hardware system 400 for classifying malware, consistent with certain disclosed embodiments. The example system 400 includes example system components that may be used. The components and arrangement, however, may be varied.

Computer 401 may include processor 410, memory 420, storage 430, and input/output (I/O) devices (not pictured). The computer 401 may be implemented in various ways and can be configured to perform any of the embodiments described above. In some embodiments, computer 401 can be a general purpose computer of an end user such as, for example, a desktop computer, a laptop, a tablet device, a mobile device (e.g., a smartphone), etc. In other embodiments, computer 401 can be a computing device such as, for example, a data base server (e.g., a domain name registry), a web server, a mainframe computer, etc. Computer 401 may be standalone or may be part of a subsystem, which may, in turn, be part of a larger system.

The processor 410 may include one or more known processing devices, such as a microprocessor from the Intel Core™ family manufactured by Intel™, the Phenom™ family manufactured by AMD™, or the like. Memory 420 may include one or more storage devices configured to store information and/or instructions used by processor 410 to perform certain functions and operations related to the disclosed embodiments. Storage 430 may include a volatile or non-volatile, magnetic, semiconductor, tape, optical, removable, non-removable, or other type of computer-readable medium used as a storage device. In some embodiments, storage 430 can include, for example, traffic data, multivariate feature vectors, sample feature vectors, malware family models, etc.

In an embodiment, memory 420 may include one or more programs or subprograms including instructions that may be loaded from storage 430 or elsewhere that, when executed by computer 401, perform various procedures, operations, or processes consistent with disclosed embodiments. For example, memory 420 may include a malware classification program 425 for processing feature vectors to separate malware feature vectors from background noise, scoring feature vectors based on malware classifications, and applying labels to traffic data, according to various disclosed embodiments. Memory 420 may also include other programs that perform other functions, operations, and processes, such as programs that provide communication support, Internet access, etc. The malware classification program 425 may be embodied as a single program, or alternatively, may include multiple sub-programs that, when executed, operate together to perform the function of the malware classification program 425 according to disclosed embodiments. In some embodiments, malware classification program 425 can perform all or part of the processes of FIGS. 1 and 2, described above.

Computer 401 may communicate over a link with network 440. For example, the link may be a direct communication link, a local area network (LAN), a wide area network (WAN), or other suitable connection. Network 440 may include the internet, as well as other networks, which may be connected to various systems and devices.

Computer 401 may include one or more input/output (I/O) devices (not pictured) that allow data to be received and/or transmitted by computer 401. I/O devices may also include one or more digital and/or analog communication I/O devices that allow computer 401 to communicate with other machines and devices. I/O devices may also include input devices such as a keyboard or a mouse, and may include output devices such as a display or a printer. Computer 401 may receive data from external machines and devices and output data to external machines and devices via I/O devices. The configuration and number of input and/or output devices incorporated in I/O devices may vary as appropriate for various embodiments.

Example uses of the system 400 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
    a processing system of a device comprising one or more processors; and
    a memory system comprising one or more computer-readable media, wherein the one or more computer-readable media contain instructions that, when executed by the processing system, cause the processing system to perform operations comprising:
    receiving traffic data comprising malware events and background noise;
    converting the traffic data into a feature vector;
    performing a signal processing algorithm on the feature vector to determine an unmixing matrix that separates the feature vector into a first subcomponent including the malware events and a second subcomponent including the background noise, wherein the signal processing algorithm is associated with a malware family and is trained on a first set of sample feature vectors corresponding to malware traffic generated by a device affected by the malware family and a second set of sample feature vectors corresponding to sample background noise generated by a second device unaffected by the malware family;
    determining a score for the malware events using a malware classification algorithm associated with the malware family; and
    applying a label associated with the malware family to the traffic data based on the score.

2. The system of claim 1, wherein converting the traffic data into the feature vector comprises:
    converting events in the traffic data into words; and
    performing an n-gram analysis on the words.

3. The system of claim 1, wherein the signal processing algorithm is an independent component analysis signal processing algorithm.

4. The system of claim 1, wherein the signal processing algorithm is associated with the malware family based on inputting a model for the malware family into the signal processing algorithm.

5. The system of claim 1, wherein the classification algorithm is associated with the malware family based on inputting the first set of sample feature vectors corresponding to the malware family into the classification algorithm.

6. The system of claim 1, the operations further comprising at least one of containing, removing, or neutralizing the effects of a malware application that created the malware events based on the label.

7. The system of claim 1, the operations further comprising:
    performing a second signal processing algorithm on the feature vector to separate the malware events from the background noise, wherein the second signal processing algorithm is associated with a second malware family; and
    determining a second score for the malware events using a second malware classification algorithm associated with the second malware family, wherein applying the label associated with the malware family to the traffic data is further based on comparing the score to the second score.

8. The system of claim 7, wherein:
    comparing the score to the second score comprising performing a distance function on the score and the second score; and
    applying the label associated with the malware family to the traffic data is further based on a distance determined by the distance function.

9. A computer-implemented method, comprising:
    receiving traffic data comprising malware events and background noise;
    converting the traffic data into a feature vector;
    performing a signal processing algorithm on the feature vector to determine an unmixing matrix that separates the feature vector into a first subcomponent including the malware events and a second subcomponent including the background noise, wherein the signal processing algorithm is associated with a malware family and is trained on a first set of feature vectors corresponding to malware traffic generated by a device affected by the malware family and a second set of feature vectors corresponding to sample background noise generated by a second device unaffected by the malware family;
    determining a score for the malware events using a malware classification algorithm associated with the malware family; and
    applying a label associated with the malware family to the traffic data based on the score.

10. The computer-implemented method of claim 9, wherein converting the traffic data into the feature vector comprises:
    converting events in the traffic data into words; and
    performing an n-gram analysis on the words.

11. The computer-implemented method of claim 9, wherein the signal processing algorithm is an independent component analysis signal processing algorithm.

12. The computer-implemented method of claim 9, wherein the signal processing algorithm is associated with the malware family based on inputting a model for the malware family into the signal processing algorithm.

13. The computer-implemented method of claim 9, wherein the classification algorithm is associated with the malware family based on inputting the first set of sample feature vectors corresponding to the malware family into the classification algorithm.

14. The computer-implemented method of claim 9, further comprising at least one of containing, removing, or neutralizing the effects of a malware application that created the malware events based on the label.

15. The computer-implemented method of claim 9, further comprising:
performing a second signal processing algorithm on the feature vector to separate the malware events from the background noise, wherein the second signal processing algorithm is associated with a second malware family; and
determining a second score for the malware events using a second malware classification algorithm associated with the second malware family, wherein applying the label associated with the malware family to the traffic data is further based on comparing the score to the second score.

16. The computer-implemented method of claim 15, wherein:
comparing the score to the second score comprising performing a distance function on the score and the second score; and
applying the label associated with the malware family to the traffic data is further based on a distance determined by the distance function.

17. A non-transitory computer-readable medium storing instructions that, when executed by at least one processor of a computing system, cause the computing system to perform a method comprising:
receiving traffic data comprising malware events and background noise;
converting the traffic data into a feature vector;
performing a signal processing algorithm on the feature vector to determine an unmixing matrix that separates the feature vector into a first subcomponent including the malware events and a second subcomponent including the background noise, wherein the signal processing algorithm is associated with a malware family and is trained on a first set of feature vectors corresponding to malware traffic generated by a device affected by the malware family and with a second set of feature vectors corresponding to sample background noise generated by a second device unaffected by the malware family;
determining a score for the malware events using a malware classification algorithm associated with the malware family; and
applying a label associated with the malware family to the traffic data based on the score.

18. The non-transitory computer readable storage medium of claim 17, wherein converting the traffic data into the feature vector comprises:
converting events in the traffic data into words; and
performing an n-gram analysis on the words.

19. The non-transitory computer readable storage medium of claim 17, the method further comprising at least one of containing, removing, or neutralizing the effects of a malware application that created the malware events based on the label.

20. The non-transitory computer readable storage medium of claim 17, the method further comprising:
performing a second signal processing algorithm on the feature vector to separate the malware events from the background noise, wherein the second signal processing algorithm is associated with a second malware family; and
determining a second score for the malware events using a second malware classification algorithm associated with the second malware family, wherein applying the label associated with the malware family to the traffic data is further based on comparing the score to the second score.

\* \* \* \* \*